United States Patent Office 3,133,023
Patented May 12, 1964

3,133,023
PREPARATION OF COATINGS AND
PRINTING INKS
Marcel J. Vogel, San Jose, Calif., assignor to International Business Machines Corporation, New York, N.Y., a corporation of New York
No Drawing. Filed June 26, 1961, Ser. No. 119,305
1 Claim. (Cl. 252—62.5)

My process relates to the preparation of coatings and printing inks and, more particularly, to separating gases from ink and coatings containing pigments which respond to magnetic fields.

Magnetic inks and coatings are generally prepared by ball or roll milling a desired pigment to break up agglomerates of pigment particles and to press the vehicle against individual pigment particles with sufficient force to insure adequate wetting of the pigment. The problem of wetting pigments becomes more aggravated as the particle size of the pigment decreases.

Gas bubbles trapped in pigment particle agglomerates and gases adsorbed on individual pigment particles hamper the wetting of pigments by vehicles. Previously, chemical additives, for example, n-nitrobutane, have been utilized to aid in wetting pigments for printing inks and coatings, i.e., to displace gases from the pigment surface. While some meaure of success has resulted from the use of these additives, other and better methods of obtaining the desired results are needed.

I have now discovered that magnetic fields can be utilized to obtain gas release in such formulations in short periods of time.

Generally speaking, the release of gases from pigment-vehicle mixtures containing ferromagnetic pigments is readily accomplished by placing the mixture in a magnetic field and manipulating the pigment-vehicle mixture or the magnetic field to cause movement of the powder within the vehicle.

The term "manipulating" is means to include the following process alternatives:

(a) A magnetic mixture is passed through a magnetic field;
(b) A magnetic field is moved through a magnetic mixture of powder and vehicle;
(c) The direction of a magnetic field passing through a magnetic mixture is alternated or otherwise changed; and
(d) One or more of the above procedures are combined.

The process is operative for wetting magnetic powders. Magnetic powders are those which are affected by magnetic fields, i.e., powders which will be displaced from one position to a second position by application of a magnetic field. Powders which are affected by magnetic fields include powders of iron, nickel, cobalt, bismuth, and antimony; and alloys such as Permalloy, Hypernik and Alnico. Preferably, the powders are ferromagnetic, i.e., strongly magnetic and containing inherently magnetic particles, for instance of iron. Generally speaking, the powders useful in preparing magnetic printing inks and coatings have particle sizes on the order of about 0.5–60 microns and are preferably on the order of about 0.5 to about 2.0 microns. The relative motion of a magnetic particle, or mixture of particles, and a thick fluid vehicle under the action of a magnetic field is referred to above in one form or another inasmuch as this constitutes the magnetic motive power whereby the particles are separated and wetted and the mix is outgassed. The purposes of this "magnetic agitation" are two-fold.

One purpose is simply that of any stirring process; namely, relative motion between cohering particles or "clumps" of particles to "de-clump" or disperse them by mere frictional contact. The second, and more important object, is to homogeneously magnetize all of the particles. This tends to align these tiny magnets and this, in turn, tends to pull them out of their "clumping attitude" inducing a mutual repulsive action; hence, the dispersal of the clumped ferromagnetic particles.

The need for this dispersal or de-clumping of the ferromagnetic particles may not be apparent without consideration of prior art dispersal techniques involving some form of mechanical pressurizing of particulate clumps, as for instance, conventional ball-milling or grinding methods. The purpose, of course, is to reduce particle size and homogeneously disperse the particles throughout the mix. The inadequacy of much milling for breaking up clumps of small, sagittal (or needle-like) ferromagnetic particles gave rise to the invention. It was found in ball-milling mixtures of these particles in a viscous medium that the clumps, due to the inherent magnetic attraction of particles, entirely resisted any attempts to crush them. In fact, protracted milling only aggravated clumping and gave rise to an attendant increase in mix viscosity. Evidently, no matter how fine the mill attempts to grind them, these clumps exhibit a plastic or elastic tendency to regain their clumped form. This is evidently the result of magnetic attraction between the ferromagnetic "needles" constituting the clumps. The problem is aggravated by the fact that, being pointed, or needle-like, the particles can compact very tightly together and resist any penetration and wetting by the fluid medium, which wetting would help to disengage them. The formation of gas envelopes about many of these clumps, which serve as nuclei for occluded gases, only further prevents the wetting of the individual particles.

However, it was discovered that the imposition of a magnetic field seems to be able to disperse the tiny ferro-magnets, especially if the dispersal is initiated by magnetically agitating or "rocking" the particles. This agitation can be produced by a change of direction of the lines of magnetic flux with respect to a particle. Agitation can thus be produced by changing the flux direction or by moving the particle, for example, by shaking the mix container while keeping flux constant. This evidently operates as a quasiparticle-rocking action which initiates dispersion, at least momentarily, by enabling some or most of the tiny magnets to flip into an aligned (hence, un-clumped) attitude and this, in turn, permits the fluid to penetrate the clump envelope between the particles and to wet them. The film of wetting fluid about a particle serves to keep it permanently separated, evidently shielding its tiny magnetic field. This de-clumping effect via magnetic agitation does more than merely homogenize particle density. It also serves to out-gas the mixture since, in destroying particulate clumps, it destroys the nuclei to which the gas has adsorbed in a kind of envelope. This envelope also inhibits wetting of the clumped particles as noted before. Hence, by indirection, magnetization of the particles can outgas a mixture and assist in the wetting of particles therein. Thus, it is that "magnetic agitation," i.e., magnetizing and magnetically moving, particles can disperse them and allow them to be wetted and remove occluded gas as well.

Vehicles which are used to coat magnetic discs, tapes, and to form magnetic inks can be used in this process. These vehicles may be thermosetting or thermoplastic resins, such as those used for coating discs and tapes, respectively. Alternately, the vehicle can be a binder formulation from which molded, cast or extruded magnets can be formed.

The viscosity of these vehicles must be sufficient to prevent pigment particles from rapidly following the applied magnetic lines of force. For ease of discussion, such viscosities will be termed "high viscosity." Generally, the viscosities of pigment-vehicle mixtures which are treated in my process are on the order of about 200–100,000 centipoises. Preferably, the viscosity of these mixtures is from about 400 to about 10,000 centipoises, and still more preferably, the viscosity of mixture is about 1,000 centipoises.

The magnetic fields utilized in my process can be exerted by permanent magnets or electromagnets. The strength of the magnetic field required to carry out the instant process will vary according to the degree of degasification desired, the degree to which a magnetic field will affect a particular pigment, the vehicle formulation being utilized, etc. A required magnetic field strength can be readily obtained by moving the powder-vehicle mixture within the magnetic field while slowly increasing the magnetic field strength until bubbles are observed to form in the mixture. The optimum magnetic field strength will depend upon factors such as the required process time, equipment limitations, and power supply. The strength of the magnetic field required increases as the viscosity of the mixture increases.

Generally, magnetic fields in excess of about 1,000 gauss will be required. Preferably, magnetic fields are on the order of 1,500 gauss, and more particularly, on the order of about 2,000 gauss.

The following examples more fully illustrate my invention. However, it is not intended that my invention be limited to the exact processes, magnetic field strength, magnetic particles or vehicle formulations disclosed therein. Rather, it is intended that all equivalents obvious to those skilled in the art be included within the scope of my invention as claimed.

*Example I*

In one of a series of qualitative experiments, out of which the described invention evolved, half of a 20 cc. test tube of a magnetic iron oxide-epoxy-phenolic resin vehicle mixture which poured very slowly, i.e., with the speed of cold molasses, was placed in the 0.75 in. gap of a G. E. MA 3963–SMD–7 Alnico magnet. This magnet had a flux density of 1,750±50 gauss. The test tube was slowly raised and lowered within the gap of the magnet and bubbles could be seen to form as the magnetic particles compacted in the area of greatest flux density. By working the test tube up and down within the field, a froth of bubbles was forced from the highly viscous mixture.

*Example II*

To test my invention, about 900 g. of a magnetic disc coating vehicle is made up by dissolving 1,400 g. of epoxy resin, having a melting point of 120–135° C. and epoxide equivalent of 2,000–2,500, and 200 g. of diacetone alcohol in 1,000 g. each of xylene and toluene. 2,000 g. of magnetic iron oxide, having a particle size of about 0.2 to about 2.0 microns, is stirred into the epoxy resin. A 10 ml. portion of pigment-vehicle mixture in a 20 ml. test tube, having a viscosity of about 400–500 centipoises, is then placed in a magnetic field of about 5,000 gauss, and slowly raised and lowered within the magnetic field. Wetting is indicated by the appearance of bubbles in the pigment-vehicle mixture and escape of the bubbles therefrom.

*Example III*

To further test the invention, a pigment-vehicle mixture is prepared having a viscosity of about 1,000 centipoises. Pigment wetting is accomplished by placing a 20 cc. test tube of the mixture in a 5,000 gauss magnetic field and alternately raising and lowering the magnetic field relative to the test tube.

*Example IV*

In an alternate process, a second portion of the mixture of Example III is placed in a 20 ml. test tube and the pigment wetted by alternately establishing or rotating, in opposite directions, the magnetic field around the test tube.

Now, having described my invention, I claim:

A method for wetting magnetizable particles below 60 microns in size with a liquid vehicle having a viscosity above 200 centipoises, the major portion of said particles having gases adsorbed on the individual particles and being present in the liquid vehicle as a plurality of agglomerates with gases trapped therein, said method comprising the steps of:

applying a magnetic field of a strength sufficient to align the particles and move them through the liquid vehicle; and forcing the adsorbed and trapped gases from the liquid vehicle by constantly changing, with respect to one another, the position of the magnetic field and the liquid vehicle while maintaining the vehicle within the field so as to vary the direction of movement of the particles through the vehicle a sufficient number of times to break them out of said agglomerates and displace the gases adsorbed on their surfaces with the liquid vehicle thereby preventing the particles from again agglomerating together.

References Cited in the file of this patent

UNITED STATES PATENTS

| | | |
|---|---|---|
| 1,889,380 | Ruben | Nov. 29, 1932 |
| 2,418,479 | Pratt et al. | Apr. 8, 1947 |
| 2,456,313 | Pratt | Dec. 14, 1948 |
| 3,066,355 | Schloemann et al. | Dec. 4, 1962 |
| 3,067,140 | Davis | Dec. 4, 1962 |

FOREIGN PATENTS

| | | |
|---|---|---|
| 152,764 | Australia | Aug. 11, 1953 |
| 705,050 | Great Britain | Mar. 3, 1954 |